United States Patent
da Silva et al.

(10) Patent No.: US 9,992,736 B2
(45) Date of Patent: Jun. 5, 2018

(54) METHODS, WIRELESS DEVICE, AND A NETWORK NODE FOR RECEIVING AND TRANSMITTING SYSTEM INFORMATION IN A WIRELESS COMMUNICATIONS NETWORK

(71) Applicant: Telefonaktiebolaget LM Ericsson (publ), Stockholm (SE)

(72) Inventors: Icaro L. J. da Silva, Bromma (SE); Gunnar Mildh, Sollentuna (SE); Jose Luis Pradas, Stockholm (SE); Johan Rune, Lidingö (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 0 days. days.

(21) Appl. No.: 15/538,977

(22) PCT Filed: Sep. 7, 2015

(86) PCT No.: PCT/SE2015/050943
§ 371 (c)(1),
(2) Date: Jun. 22, 2017

(87) PCT Pub. No.: WO2017/044016
PCT Pub. Date: Mar. 16, 2017

(65) Prior Publication Data
US 2017/0353915 A1   Dec. 7, 2017

(51) Int. Cl.
*H04W 4/00* (2018.01)
*H04W 48/16* (2009.01)
*H04W 48/18* (2009.01)

(52) U.S. Cl.
CPC .......... *H04W 48/16* (2013.01); *H04W 48/18* (2013.01)

(58) Field of Classification Search
CPC .................................................... H04W 48/16
(Continued)

(56) References Cited

U.S. PATENT DOCUMENTS

2008/0253399 A1   10/2008   Wang et al.
2008/0274737 A1   11/2008   Lee
2010/0081433 A1    4/2010   Lee

FOREIGN PATENT DOCUMENTS

EP         2632206 A1      8/2013
WO     2013014636 A1      1/2013

OTHER PUBLICATIONS

3GPP, "3GPP TS 36.304 V12.5.0 (Jun. 2015)", 3rd Generation Partnership Project; Technical Specification Group Radio Access Network; Evolved Universal Terrestrial Radio Access (E-UTRA); User Equipment (UE) procedures in idle mode (Release 12), Jun. 2015, pp. 1-38.

*Primary Examiner* — Joel Ajayi
(74) *Attorney, Agent, or Firm* — Murphy, Bilak & Homiller, PLLC

(57) ABSTRACT

A method performed by a wireless device (121) for receiving system information from a network node (110) in a wireless communications network (100) is provided. The wireless device first receives a first system information indicating one or more Public Land Mobile Networks, PLMNs, supported on a frequency carrier by the network node (110). Then, the wireless device determines if the one or more PLMNs indicated in the first system information exclude all PLMN(s) supported by the wireless device (121). When the one or more PLMNs indicated in the first system information does not exclude all PLMN(s) supported by the wireless device (121), then the wireless device receives a second system information comprising the one or more PLMNs supported on the frequency carrier by the network node (110). A wireless device (121) for receiving (Continued)

system information is also provided. Further, a network node and a method therein for transmitting system information are also provided.

22 Claims, 5 Drawing Sheets

(58) Field of Classification Search
USPC .......................................................... 455/434
See application file for complete search history.

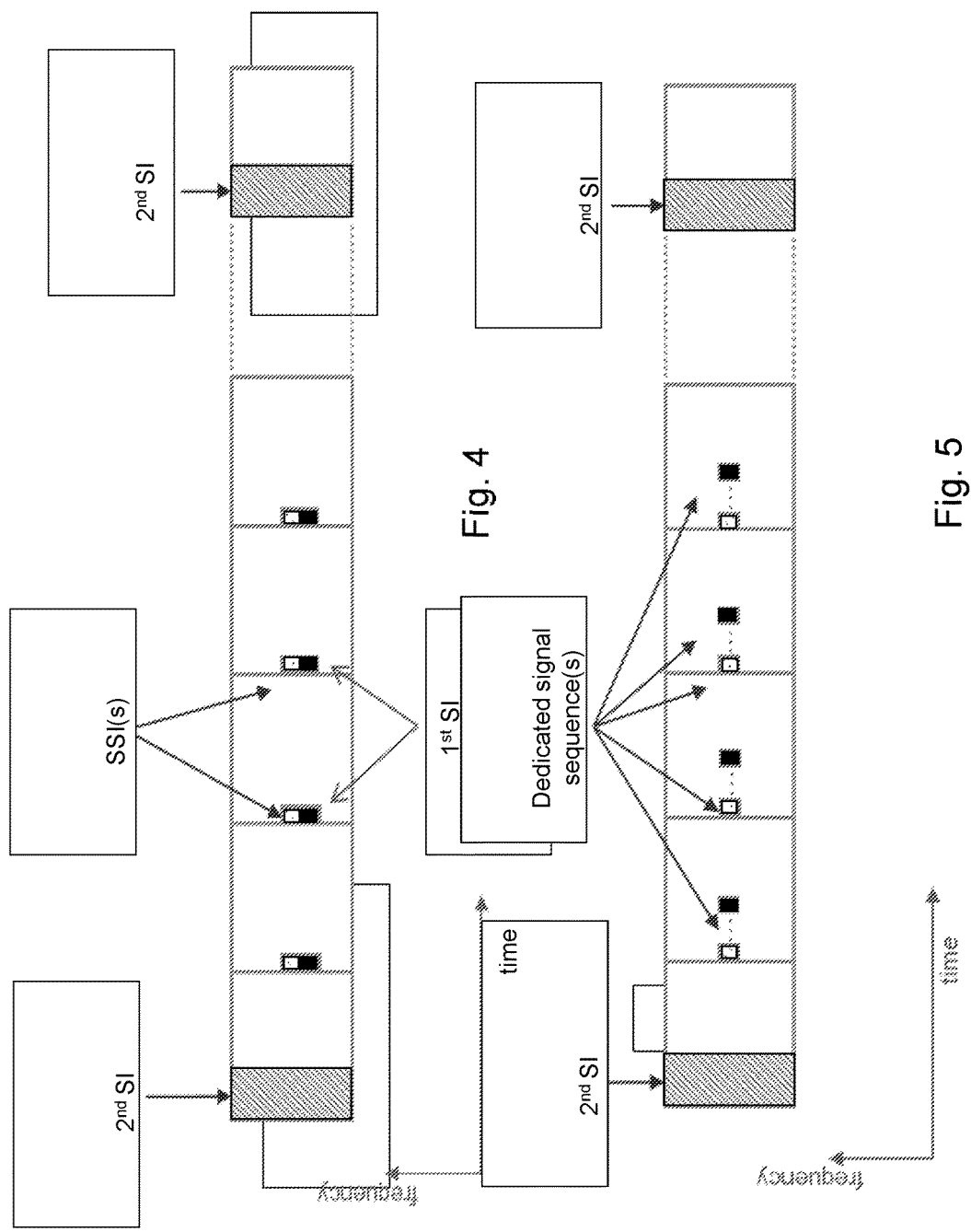

METHODS, WIRELESS DEVICE, AND A NETWORK NODE FOR RECEIVING AND TRANSMITTING SYSTEM INFORMATION IN A WIRELESS COMMUNICATIONS NETWORK

TECHNICAL FIELD

Embodiments herein relate to system information in a wireless communications network. In particular, embodiments herein relate to a wireless device, a network node and methods therein for receiving and transmitting system information in a wireless communications network.

BACKGROUND

In a typical wireless communications network, wireless devices, also known as mobile stations, terminals and/or user equipments, UEs, communicate via a Radio Access Network, RAN, to one or more core networks, CNs. The wireless access network covers a geographical area which is divided into cell areas, with each cell area being served by a base station, e.g. a radio base station, RBS, or network node, which in some networks may also be called, for example, a "NodeB" or "eNodeB". A cell is a geographical area where radio coverage is provided by the radio base station at a base station site or an antenna site in case the antenna and the radio base station are not co-located. Each cell is identified by an identity within the local radio area, which is broadcast in the cell. Another identity identifying the cell uniquely in the whole mobile network is also broadcasted in the cell. The base stations communicate over the air interface operating on radio frequencies with the wireless devices within range of the base stations.

A Universal Mobile Telecommunications System, UMTS, is a third generation mobile communication system, which evolved from the second generation, 2G, Global System for Mobile Communications, GSM. The UMTS terrestrial radio access network, UTRAN, is essentially a RAN using wideband code division multiple access, WCDMA, and/or High Speed Packet Access, HSPA, for wireless devices. In a forum known as the Third Generation Partnership Project, 3GPP, telecommunications suppliers propose and agree upon standards for third generation networks and UTRAN specifically, and investigate enhanced data rate and radio capacity. In some versions of the RAN as e.g. in UMTS, several base stations may be connected, e.g., by landlines or microwave, to a controller node, such as a radio network controller, RNC, or a base station controller, BSC, which supervises and coordinates various activities of the plural base stations connected thereto. The RNCs are typically connected to one or more core networks.

Specifications for the Evolved Packet System, EPS, have been completed within the 3$^{rd}$ Generation Partnership Project, 3GPP, and this work continues in the coming 3GPP releases. The EPS comprises the Evolved Universal Terrestrial Radio Access Network, E-UTRAN, also known as the Long Term Evolution, LTE, radio access, and the Evolved Packet Core, EPC, also known as System Architecture Evolution, SAE, core network. E-UTRAN/LTE is a variant of a 3GPP radio access technology wherein the radio base station nodes are directly connected to the EPC core network rather than to RNCs. In general, in E-UTRAN/LTE the functions of a RNC are distributed between the radio base stations nodes, e.g. eNodeBs in LTE, and the core network. As such, the Radio Access Network, RAN, of an EPS has an essentially flat architecture comprising radio base station nodes without reporting to RNCs.

In 3GPP systems, in general, each operator network run by a specific operator in a specific country in a wireless communication network may be referred to by its Public Land Mobile Network(s), PLMN(s). Typically, a wireless device may potentially be able to access the wireless communications network if one or more of the PLMNs registered in the wireless device, such as, for example, its Home PLMN, matches the PLMN(s) that is broadcasted by the wireless communications network for the operator networks. This is performed for each frequency carrier in the wireless communications network. In E-UTRAN, for example, this is performed in a procedure commonly referred to as PLMN selection, which is handled by the Non-Access Stratum, NAS, and the Access Stratum, AS.

In a scanning process during initial access in a wireless communications network, such as, e.g. when being powered on, a wireless device will typically go through the different carrier frequencies to find a carrier frequency on which it is capable of transmitting. This scanning process comprises a carrier synchronization, from a physical layer point of view, which is followed by the acquisition of system information. The acquired system information allows the wireless device to check if it is potentially allowed or not to be served on a given carrier frequency, for example, does one or more of the PLMNs registered in the wireless device matches the PLMN(s) that is broadcasted for the given carrier frequency.

The system information is typically broadcasted by the wireless communications network in a portion of the frequency band known by the wireless device. For example, in E-UTRAN, the initial system information, commonly referred to as the Master Information Block, MIB, is always transmitted in fixed sub-frames within a radio frame and in the central six (6) resource blocks of the frequency band.

However, although 3GPP does not specify a detailed procedure for PLMN Selection, 3GPP TS 36.304 describes what is referred to as "Support for PLMN Selection" which states that:

"The UE shall scan all RF channels in the E-UTRA bands according to its capabilities to find available PLMNs. On each carrier, the UE shall search for the strongest cell and read its system information, in order to find out which PLMN(s) the cell belongs to. If the UE can read one or several PLMN identities in the strongest cell, each found PLMN (see the PLMN reading in [3]) shall be reported to the NAS as a high quality PLMN (but without the RSRP value), provided that the following high quality criterion is fulfilled:

1. For an E-UTRAN cell, the measured RSRP value shall be greater than or equal to −110 dBm.

Found PLMNs that do not satisfy the high quality criterion, but for which the UE has been able to read the PLMN identities are reported to the NAS together with the RSRP value. The quality measure reported by the UE to NAS shall be the same for each PLMN found in one cell. The search for PLMNs may be stopped on request of the NAS. The UE may optimise PLMN search by using stored information e.g. carrier frequencies and optionally also information on cell parameters from previously received measurement control information elements. Once the UE has selected a PLMN, the cell selection procedure shall be performed in order to select a suitable cell of that PLMN to camp on. If a CSG ID is provided by NAS as part of PLMN selection, the UE shall search for an acceptable or suitable cell belonging to the provided CSG ID to camp on. When the UE is no longer camped on a cell with the provided CSG ID, AS shall inform NAS."

Table 1 shows a brief description of what is done by the AS and NAS at the wireless device according to 3GPP TS 36.304

TABLE 1

| Idle Mode Process | UE Non-Access Stratum | UE Access Stratum |
|---|---|---|
| PLMN Selection | Maintain a list of PLMNs in priority order according to [5]. Select a PLMN using automatic or manual mode as specified in [5] and request AS to select a cell belonging to this PLMN. For each PLMN, associated RAT(s) may be set. Evaluate reports of available PLMNs from AS for PLMN selection. Maintain a list of equivalent PLMN identities. | Search for available PLMNs. If associated RAT(s) is (are) set for the PLMN, search in this (these) RAT(s) and other RAT(s) for that PLMN as specified in [5]. Perform measurements to support PLMN selection. Synchronise to a broadcast channel to identify found PLMNs. Report available PLMNs with associated RAT(s) to NAS on request from NAS or autonomously. |

It is important to keep the delay from the moment the wireless device powers on, or recovers from an out-of-coverage situation, until the wireless device can actually make sure that a given frequency carrier is potentially allowed to be accessed as short as possible; potentially, here, meaning that just because a given frequency carrier is from the Home PLMN of the wireless device does not yet mean that the wireless device can access the carrier, i.e. that the given carrier frequency belongs to an allowed PLMN. The delay for the wireless device from powering on, or recovery, until the wireless device can actually make sure that a given frequency belongs to an allowed PLMN is proportional to the number of radio frequency, RF, channels that the wireless device has to scan and retrieve the system information and the PLMN(s) from. This also means that an increased number of capable wireless devices, i.e. wireless devices with broad range of possible RFs, in the wireless communication network will also give an increased number of wireless device which potentially takes longer times to scan its possible carrier frequencies.

According to recent research into future 5G networks, very high frequencies, such as, frequencies between 6-100 GHz, are considered candidate frequencies to be able to cope with the new increased data rates and/or capacity requirements. At the same time, future 5G system networks may potentially also use spectrum currently allocated to other systems, such as, for example, E-UTRA, UTRA, or the unlicensed spectrum, e.g. WFi. This means that a much higher number of frequency carriers that a wireless device will need to scan during initial access in the future is to be expected.

SUMMARY

It is an object of embodiments herein to reduce the access time for wireless devices in a wireless communication network.

According to a first aspect of embodiments herein, the object is achieved by a method performed by a wireless device for receiving system information from a network node in a wireless communications network is provided. The wireless device first receives a first system information indicating one or more Public Land Mobile Networks, PLMNs, supported on a frequency carrier by the network node. Then, the wireless device determines if the one or more PLMNs indicated in the first system information exclude all PLMN(s) supported by the wireless device. When the one or more PLMNs indicated in the first system information does not exclude all PLMN(s) supported by the wireless device, then the wireless device receives a second system information comprising the one or more PLMNs supported on the frequency carrier by the network node.

According to a second aspect of embodiments herein, the object is achieved by a wireless device for receiving system information from a network node in a wireless communications network. The wireless device is configured to receive a first system information indicating one or more PLMNs supported on a frequency carrier by the network node, determine if the one or more PLMNs indicated in the first system information exclude all PLMN(s) supported by the wireless device, and receive a second system information comprising the one or more PLMNs supported on the frequency carrier by the network node when the one or more PLMNs indicated in the first system information does not exclude all PLMN(s) supported by the wireless device.

According to a third aspect of embodiments herein, the object is achieved by a method performed by a network node for transmitting system information to a wireless device in a wireless communications network. The network node transmits a first system information indicating one or more PLMNs supported on a frequency carrier by the network node according to a first timing interval. The network node also transmits a second system information comprising the one or more PLMNs supported on the frequency carrier by the network node according to a second timing interval, wherein the second timing interval is longer than the first timing interval.

According to a fourth aspect of embodiments herein, the object is achieved by a network node for transmitting system information to a wireless device in a wireless communications network. The network node is configured to transmit a first system information indicating one or more PLMNs supported on a frequency carrier by the network node according to a first timing interval. Also, the network node is configured to transmit a second system information comprising the one or more PLMNs supported on the frequency carrier by the network node according to a second timing interval, wherein the second timing interval is longer than the first timing interval.

By being able to exclude a frequency carrier before having to wait upon receiving the system information broadcast comprising the full list of allowed PLMN(s) from the network node as described above, the wireless device is able to reduce the access time for wireless devices in a wireless communication network. Another advantage is that this also leads to reduce energy consumption in the wireless device, the network node and the wireless communications network.

BRIEF DESCRIPTION OF THE DRAWINGS

Features and advantages of the embodiments will become readily apparent to those skilled in the art by the following detailed description of exemplary embodiments thereof with reference to the accompanying drawings, wherein:

FIG. 4 is a schematic block diagram illustrating a frame structure according to embodiments of a method in a wireless device, FIG. 5 is a schematic block diagram illustrating a frame structure according to embodiments of a method in a wireless device.

DETAILED DESCRIPTION

Figure 1:
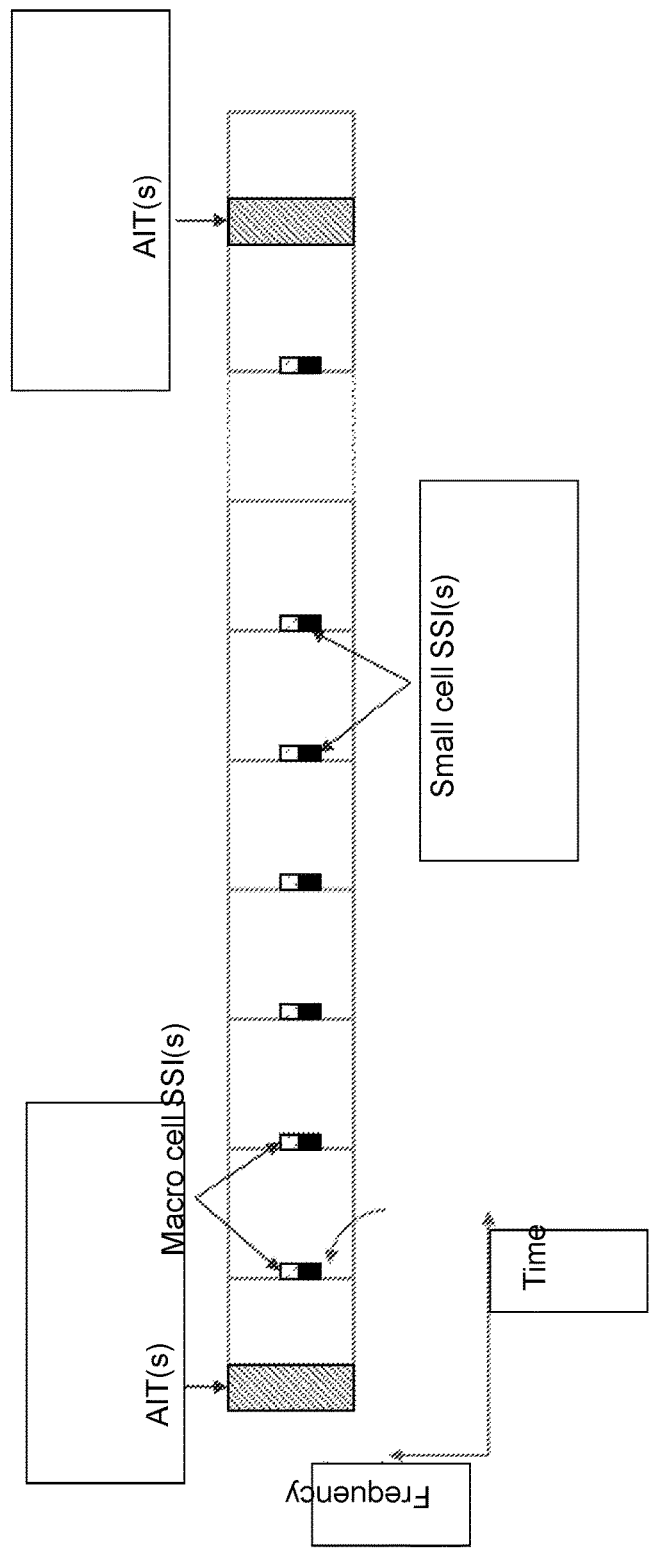
FIG. 1 is a schematic block diagram illustrating broadcasting system transmissions according to SCP.

The figures are schematic and simplified for clarity, and they merely show details which are essential to the understanding of the embodiments presented herein, while other details have been left out. Throughout, the same reference numerals are used for identical or corresponding parts or steps.

As part of understanding and developing the embodiments described herein, some further issues and problems will first be identified and discussed in more detail.

One problem that has been identified in wireless communications network for LTE is that the network nodes broadcasts system information, including the PLMN (s), continuously regardless of whether or not there are any wireless devices served by the network node actually reading the broadcasted system information. Therefore, solutions has been proposed that aims to minimize the broadcasts of system information in order to be more energy efficient and generate less interference in the wireless communications network. One example of such a solution is referred to as System Control Plane, SCP.

In SCP, the system information, i.e. information equivalent to what is conferred by the MIB, SIB1, SIB2 in LTE, is not explicitly broadcasted as in LTE. Instead, SCP suggests using infrequent broadcast transmissions, e.g. every 10 seconds or so, of all possible configurations of the system information, such as, e.g. MIB, SIB1 and SIB2, providing, for example, all parameter value combinations that are used in a PLMN or a region of a PLMN. Furthermore, in these infrequent broadcast transmissions and associated to these configurations, some kind of index mapping is introduced, wherein each configuration (i.e. parameter value combination) gets its own index. These indexes, which may be in the form of so-called System Signatures, SSI, are similar to pointers, which each points to an entry in a table referred to as an Access Information Table, AIT. Each entry in the AIT comprise one configuration. According to SCP, the infrequent transmissions are combined with frequent broadcast transmissions of the indexes (SSIs). For example, the indexes (SSIs) may be broadcasted every 100 ms within a given area where a given system information configuration is applied. According to some examples, the indexes (SSIs) may be similar to the Primary Synchronization Signals/Secondary Synchronization Signal, PSS/SSS, signals in LTE.

SCP aims to reduce the amount of broadcasted system information by assuming that most of the time the wireless devices has access to stored copies of possible configurations, i.e. the AIT. Hence, the wireless device may instead use the broadcasted indexes/SSIs to point to the correct configuration for a given area.

FIG. 1 shows one possible configuration of broadcast transmissions of the infrequent system information, i.e. the possible configurations (AIT), and the frequent system information, i.e. the indexes (SSI(s)), in SCP. Furthermore, according to SCP, the system information transmitted in the AIT comprise the PLMN list, e.g. as shown according to the example below:

Common AIT
PLMN_ID_LIST=("Operator A")
LOCAL_TIME
DATE
SSI_MAPPING_TABLE:
    $SSI_{start}$=0; $N_{range}$=1024; $RACH\_CONFIG_1$;
    $FREQ\_ID_2$; $SSI_{start}$=0; $N_{range}$=1024; $RACH\_CONFIG_2$;

Implementing SCP accordingly as described above allows an improvement in energy efficiency and interference management. However, this comes at the cost of increased latency in those cases the wireless device does not have an up-to-date AIT, or is not certain that the stored AIT configuration related to a specific SSI which the wireless device wants to access or scan is the correct one.

According to a first example, this type of scenario may occur when the wireless device move into a second operator's network, e.g. from its home or first operator's network. In this case, there is a risk that the SSI value is re-used by the second operator, which could have several negative effects. For example, the wireless device may have a stored AIT configuration for that SSI, which means that the wireless device may believe it is still in the first operator's network even though it is not (and essentially is not reachable) or that the wireless device may perform access in the second operator's network using the wrong access parameters, i.e. parameters from the first operator's network. This may cause serious disturbances in the second operator's network. Alternatively, the wireless device may determine that the stored AIT configuration is not to be trusted, and determine to re-acquire the AIT configuration. However, since the wireless device essentially never knows when to trust and not to trust the stored AIT configuration, the wireless device would essentially need to re-acquire the AIT configuration every time. This would cancel all benefits of using SCP and cause long delays in initial access to the wireless communications network.

According to a second example, this type of scenario may also occur when the wireless device performs an initial power on and needs to search all available Radio Access Technologies, RATs, and carrier frequencies in order to find which PLMN(s) are available. A problem with SCP in this case is that it tries to optimize the energy efficiency based on the information available in the wireless device UE prior to access, for example, information pre-stored in the UMTS Subscriber Identity Module, USIM, of the wireless device or obtained in previous access attempts. However, at initial power on (or roaming power on), the wireless device typically does not have any AIT configuration stored. This means that the wireless device would need to acquire the whole AIT configuration for every carrier frequency before the wireless device may actually perform PLMN selection. Since the AIT configuration are only broadcasted infrequently, e.g. every 10 seconds, the wireless device would need to wait several seconds until it can receive the AIT configuration and check if the PLMN list in the AIT configuration matches the PLMN(s) stored in the USIM of the wireless device. This means that, for example, in bad radio conditions, wherein the wireless device may require to receive the AIT configuration multiple times to successfully decode it, the wireless device may take up to more than two minutes to decode a single AIT configuration for a single carrier frequency. Hence, it may potentially take minutes for the wireless device to initially access the wireless communications network.

Figure 2:
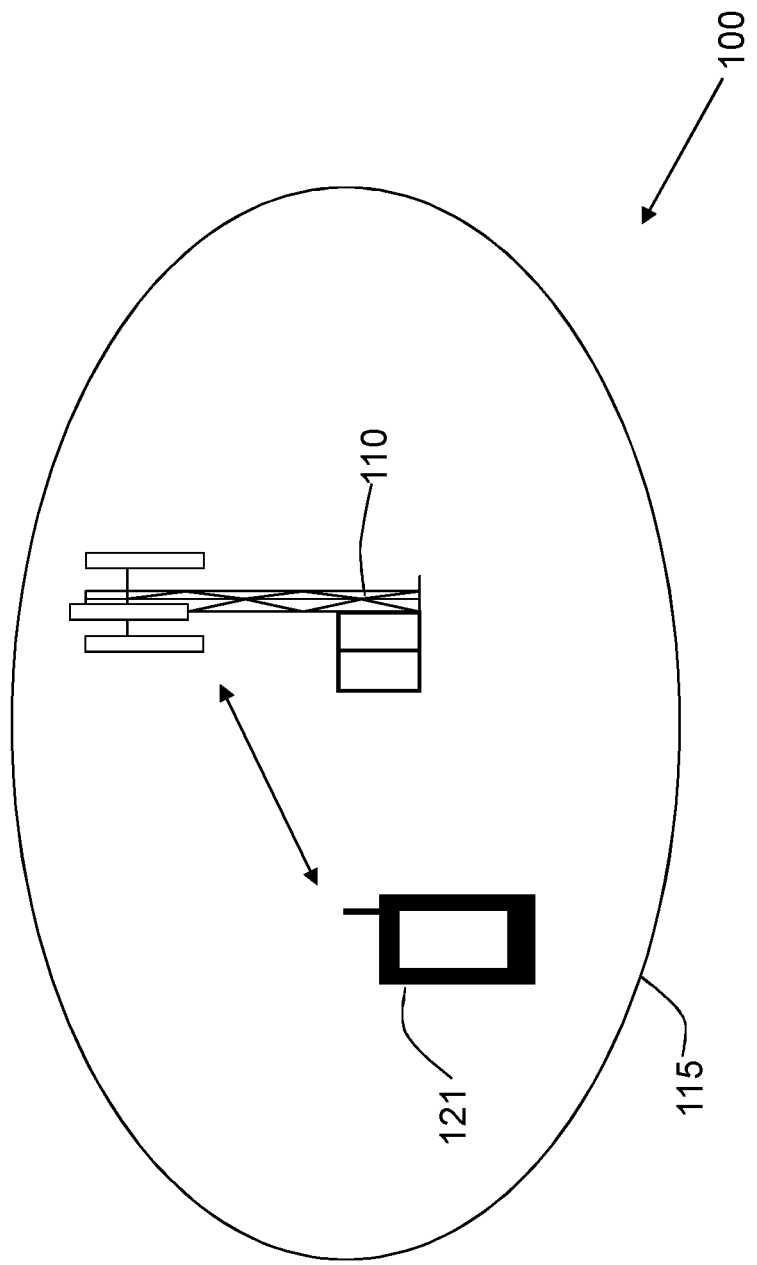
FIG. 2 is a schematic block diagram illustrating embodiments of a network node and a wireless device in a wireless communications network.

FIG. 2 depicts a wireless communications network 100 in which embodiments herein may be implemented. The wireless communications network 100 may be a radio communications network, such as, e.g. LTE, WCDMA, GSM, 3GPP cellular network, or any other cellular network or system. The wireless communications network 100 may also, for example, be referred to as a cellular network or system or a telecommunications network.

The wireless communications network 100 comprises a base station, which is referred to herein as a network node 110. The network node 110 is a network unit capable to serve wireless devices which are located within its coverage area, i.e. cell. In FIG. 1, the network node 110 served the cell 115 in the wireless communications system 100. The network node 110 may also be configured to communicate with other network nodes (not shown), e.g. other base stations or network nodes configured to operate in the same or similar way as the network node, in the wireless communications network 100.

The network node 110 may in this example e.g. be an eNB, eNodeB, or a Home Node B, a Home eNode B, femto Base Station (BS), pico BS or any other network unit capable to serve a wireless device or a machine type communication device in the wireless communications network 100. The network node 110 described herein is not limited to LTE, but may apply with any RAN, single- or multi-RAT. A multi-RAT network node may comprise a node with co-located RATs or supporting multi-standard radio (MSR) or a mixed radio node. Some other examples of applicable RATs are e.g. LTE-Advanced, UMTS, GSM, cdma2000, WIMAX, and WiFi.

A wireless device 121 is shown located within the coverage area which is served by the network node 110, i.e. cell 115. The wireless device 121 is configured to communicate within the wireless communications system 100 via the network node 110 over a radio link when the wireless device 121 is present in the cell served by the network node 110. The wireless device 121 may be capable of operating or performing measurements in one or more frequencies, carrier frequencies, component carriers or frequency bands. The wireless device 121 may also be capable of operating in single- or multi-RAT or multi-standard mode, such as, e.g. an example dual-mode wireless device 121 may operate with any one or a combination of WiFi and LTE or HSPA and LTE. The wireless device 121 may also be interchangeably referred to as a mobile station, a terminal, a wireless terminal, and/or a user equipment, UE. It may here also be pointed out that these terms as used herein should be understood by the skilled in the art as non-limiting terms comprising any wireless device or node equipped with a radio interface allowing for receiving and transmitting signals to or from the network node 110.

For example, the wireless device 121 may, for example, be a mobile terminal or a wireless terminal, a mobile, a mobile phone, a sensor, a computer such as for example a laptop, a Personal Digital Assistant (PDA) or a tablet computer with wireless capability, a wireless terminal used for Machine Type Communication (MTC), a Machine-to-Machine (M2M) communication device, a wireless device used for Device-to-Device (D2D) communication, a fixed or mobile relay or relay node, a device equipped with a wireless interface, such as a printer or a file storage device, or any other radio network unit capable of communicating over a radio link in a wireless communications system 100.

Embodiments of the network node 110, the wireless device 121 and method therein will be described in more detail below with reference to FIGS. 3-6.

Figure 3:
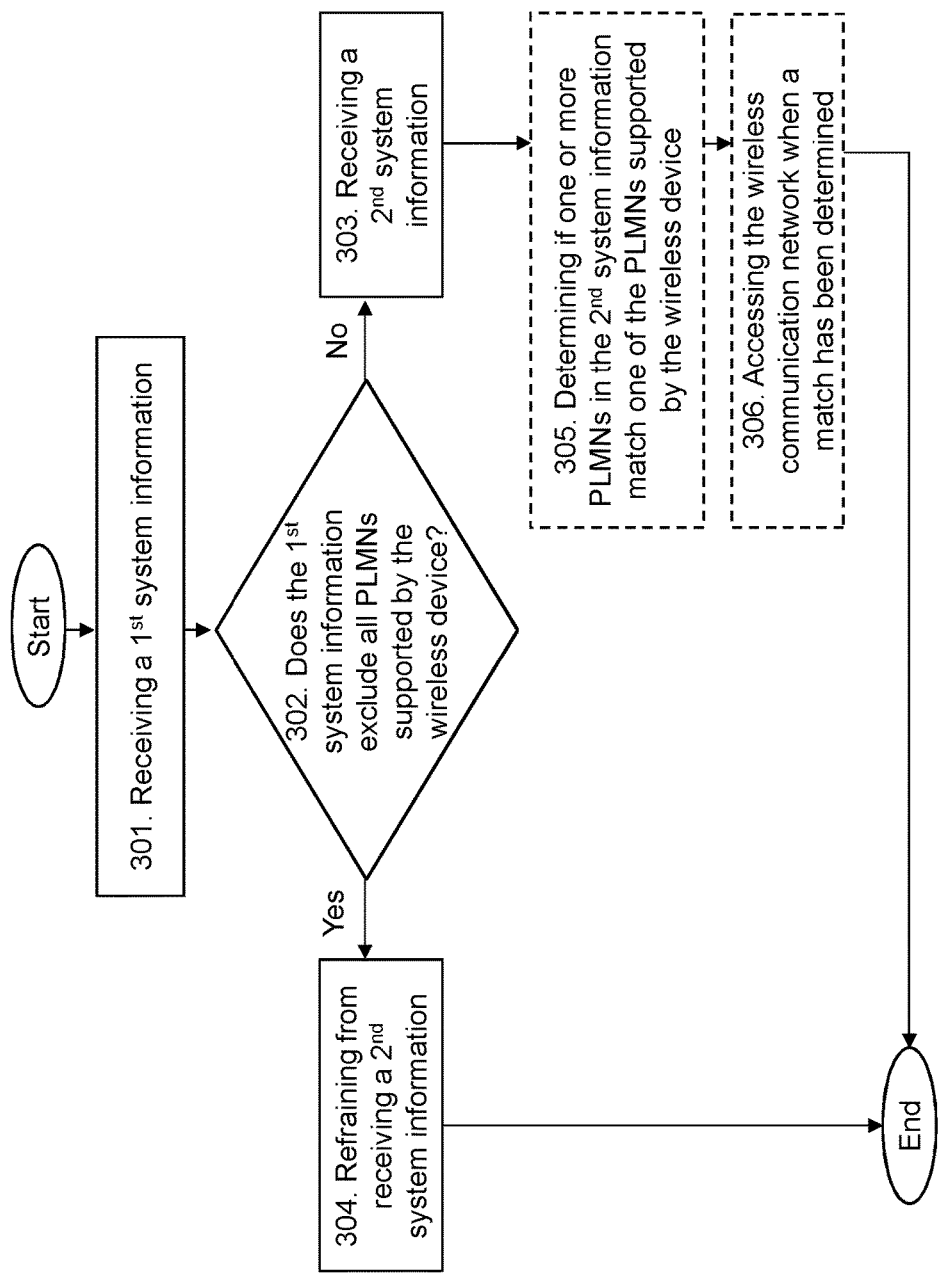
FIG. 3 is a flowchart depicting embodiments of a method in a wireless device.

Example of embodiments of a method performed by a wireless device 121 for receiving system information from a network node 110 in a wireless communications network 100 will now be described with reference to the flowchart depicted in FIG. 3. FIG. 3 is an illustrated example of actions or operations which may be taken by a wireless device 121 in the wireless communication network 100. The method may comprise the following actions.

Action 301

First, the wireless device 121 may receive a first system information indicating one or more Public Land Mobile Networks, PLMNs, supported on a frequency carrier by the network node 110. This means that the wireless device 121 receives a signal comprising the first system information broadcasted by the network node 110 and decodes the digital information bits in the signal. The first system information may be received by the wireless device 121 according to a first timing interval employed by the network node 110 for broadcasting the first system information. Here, it should be noted that the first timing interval is shorter than a second timing interval used by the network node 110 for broadcasting a second system information, as described below in Action 303. In other words, this means that the first system information is transmitted more frequent that the second system information.

Furthermore, this action may be performed by the wireless device 121 on a given frequency carrier that the wireless device 121 has selected for synchronization in the wireless communication network 100. This may be performed as part of an initial access scan by the wireless device 121 through the range of frequency carriers for which the wireless device 121 is capable of receiving on and transmitting on in the wireless communications network 100.

The selection of a given carrier frequency may be performed by different means. For example, the wireless device 121 may perform the selection by scanning a frequency band, ranking the detected frequency carriers within the frequency band based on a specific priority (e.g. the received power for each of the detected frequency carriers (e.g. highest received power goes first), information received by higher layers, or transmission history stored at the wireless device 121, etc.) and selecting the frequency carrier with the highest priority in the list first. Alternatively, the wireless device 121 may perform the selection by scanning the frequency band, and selecting the first detected carrier frequency within the scanned frequency band. Another alternative is that the wireless device 121 may perform the selection by scanning the frequency band, detecting the carrier frequencies which are provided by higher layers, or which the wireless device 121 has previously stored based on the transmission history of the wireless device 121, and selecting a carrier frequency based on this information. According to a further alternative, the wireless device 121 may perform the selection by scanning the frequency band, measuring the radio conditions for each of the detected carrier frequencies, and only selecting the carrier frequencies for which the radio condition is above a given predetermined or configured threshold.

The first system information may comprise a limited information relating to the PLMN(s) supported by the network node 110 on the given frequency carrier, i.e. PLMN(s) associated to a given frequency carrier. According to some embodiments, this limited PLMN related information may, for example, be a compressed version of the PLMN list of the network node 110. The PLMN list may comprise at least the Home PLMN of the wireless device 121. It should be noted that the compression may be made very space efficient. This is because false positives of supported PLMNs may be allowed, while false negatives of supported PLMNs should not be allowed as will be described in the following. Alternatively, according to some embodiments, the first system information may also comprise the complete PLMN list. This may be preferred when, for example, the space which the information may occupy on the radio channel is not an issue. According to some embodiments, the first system information may also comprise only one PLMN or a selected number of PLMNs comprised in the complete PLMN list.

It should here be noted that the first system information indicating one or more PLMNs should herein be interpreted as meaning that the first system information may comprise any information or signal which allows the wireless device 121 to detect whether or not it is allowed or not to access the wireless communications network 100 via the network node 110 on the given frequency carrier. In other words, since the first system information in most embodiments will not comprise the full information which unambiguously identifies the PLMN(s), the first system information may also be said to hint, imply or relate to the identity of the one or more PLMN(s) when the first system information is said to indicate the one or more PLMN(s).

Hence, in some embodiments, the one or more PLMNs indicated in the first system information is indicated by fewer bits than the number of bits required to encode the one or more PLMNs comprised in the second system information. In other words, in order to reduce the amount of bits, i.e. digital information bits, transmitted over the air interface, i.e. over radio, some embodiments may use what may herein be referred to as digested-PLMN, DPLMN, when broadcasting the first system information. The DPLMN bits, which comprise fewer bits as compared to the bits that would encode the whole PLMN or PLMN list, provide just enough information to enable the wireless device 121 check and determine if at least one of the broadcasted PLMN(s) in a given carrier that the wireless device 121 is trying to synchronize with excludes its allowed PLMNs including its Home PLMN, HPLMN.

According to one example, the DPLMN bits may represent more than one PLMN. In other words, the one or more PLMNs indicated in the first system information may be indicated by an aggregated PLMN identifying two or more PLMNs of the one or more PLMNs supported on the frequency carrier by the network node 110. Here, according to some embodiments, the Mobile Country Code, MCC, may be omitted in all but one of the PLMNs, or be received separately by the wireless device 121, whereby only the remaining PLMN ID part, i.e. the Mobile Network Code, MNC, for the listed PLMN(s) may be indicated in the first system information.

According to another example, the DPLMN bits may be a checksum of the PLMN(s). In other words, in some embodiments, the one or more PLMNs indicated in the first system information may be indicated by a checksum of the one or more PLMNs supported on the frequency carrier by the network node 110. This means, for example, that a DPLMN value, e.g. a sort of aggregated PLMN ID, may be used. This aggregated DPLMN ID may then identify any combination of the PLMN(s) supported on the frequency carrier by the network node 110. For example, DPLMN_X may identify the combination PLMN_1, PLMN_2, and PLMN_3, while DPLMN_Y may identify PLMN_2 and PLMN_4. In this case, the wireless device 121 may, for example, be provided with information indicating how the aggregated DPLMN IDs is to be interpreted. This information may be preconfigured in the wireless device 121, e.g. in the USIM, or may be received by the wireless device 121 in a transmission from a network node in a previous connection to the wireless communications network 100.

According to a further example, the DPLMN bits may be generated using a bloom filter. In other words, the one or more PLMNs indicated in the first system information may be indicated by a bloom filter generated using the one or more PLMNs supported on the frequency carrier by the network node 110. This means that a bloom filter, which is generated by hashing the PLMN codes of the PLMN(s) in the PLMN list, may be used as the first system information. An advantage of using a bloom filter is that the wireless device 121 may, upon receiving the bloom filter, determine if a specific PLMN is part of the PLMN(s) comprised in the PLMN list that generated the bloom filter. Bloom filters are similar to other checksums in that they may generate false positives, but not false negatives. The risk for false positives is depending on the size of the bloom filter or the checksum. Another advantage of using bloom filters is that they are an effective way to compress a list of large size elements, since the actual elements are not stored in the bloom filter. In the case of PLMN IDs, a bloom filter may, for example, compress 8 PLMN IDs, each being 24 bits in size (total 192 bits), down to 39 bits with a probability of false positives of less than 10%. This compression may also potentially be further enhanced by using heuristics with regards to selecting the hash functions used for the bloom filter.

Furthermore, in the above examples, according to some embodiments, the PLMN or DPLMN bits may be encoded together with any common signals transmitted more often than the second system information, as described in Action 303. According to one example, the DPLMN bits may be encoded together with System Signatures, SSIs, which also encode the index for the system information configurations as described above in cases where SCP is used. In other words, the first system information may be encoded and received by the wireless device 121 together with System Signatures, SSIs, when a System Control Plane, SCP, configuration is used for receiving the second system information in the wireless communications network 100.

One example of this is shown by the frame structure in FIG. 4. In FIG. 4, the first system information, $1^{st}$ SI, is encoded with the SSIs, i.e. the sequence encoding the index for a given system information configuration (SSI) also encodes the first system information, such as, e.g. the DPLMN bits according to the above examples. In this case, the second system information, as described below in Action 303, may be transmitted less frequently together with further system information for the given frequency carrier, or together with possible configurations and index mapping for the given frequency carrier.

According to some embodiments, the PLMN, the DPLMN bits or the PLMN list may be encoded with a signal sequence specifically dedicated to it. One alternative is to encode, for example, the DPLMN bits together with the SSIs which also encode the index for the system information configurations, as described above. Another alternative is to have multiple dedicated signatures, one for each PLMN or the PLMN bits.

One example of this is shown by the frame structure in FIG. 5. In FIG. 5, the first system information, $1^{st}$ SI, is encoded in one or more multiple synchronization sequence(s), i.e. dedicated signal sequence(s). Also in this case, the second system information, as described below in Action 303, may be transmitted less frequently together with further system information for the given frequency carrier, or together with possible configurations and index mapping for the given frequency carrier.

Action 302

After receiving the first system information in Action 201, the wireless device 121 determines if the one or more PLMNs indicated in the first system information exclude all PLMN(s) supported by the wireless device 121. Following the Action 301, the wireless device 121 is consequently provided enough information in the first system information to here check whether the given frequency carrier may possibly be used to access the wireless communications network 110 on any of its allowed or supported PLMN(s), e.g. PLMNs stored in the USIM of the wireless device 121. In other words, if all comparisons between the first system information and the allowed PLMN(s) in the wireless device 121 are negative, i.e. all PLMN(s) are excluded, then the wireless device 121 is informed that it is not allowed to access the wireless communications network 100 using its PLMN(s) on this particular frequency carrier, and therefore may stop trying to decode further information from that frequency carrier. This is described further in Action 304.

According to some embodiments, the at least one PLMN supported by the wireless device 121 may be stored in a UMTS Subscriber Identity Module, USIM, in the wireless device 121. Thus, the wireless device 121 may easily retrieve, i.e. obtain, the PLMN(s) that are supported by the wireless device 121.

Action 303

In this action, when the one or more PLMNs indicated in the first system information does not exclude all PLMN(s) supported by the wireless device 121, the wireless device 121 receives a second system information comprising the one or more PLMNs supported on the frequency carrier by the network node 110. The second system information may be received by the wireless device 121 according to a second timing interval employed by the network node 110 for broadcasting the second system information. Here, it should be noted that the second timing interval is longer than the first timing interval used by the network node 110 for broadcasting the first system information, as described above in Action 301. In other words, this means that the second system information is transmitted less frequent that the first system information.

The second system information may comprise the essential system information, wherein the essential system information here may be defined by a set of information needed to access the wireless communications network. This set of information may comprise parameters and configurations, such as, for example, Random Access CHannel (RACH) configuration, access barring parameters and/or physical layer configurations. This enables the wireless device 121 to access the wireless communications network 100 and determined whether or not the carrier frequency for which it is trying synchronize is barred or not. The second system information also comprises the full PLMN list for the frequency carrier, i.e. all supported PLMNs. In other words, the second system information comprise information enabling the wireless device 121 to access the wireless communications network 100 on the frequency carrier.

Action 304

In this action, the wireless device 121 refrains from receiving the second system information when the one or more PLMNs indicated in the first system information exclude all PLMN(s) supported by the wireless device 121. This means that if the one or more PLMNs indicated in the first system information exclude all PLMN(s) supported by the wireless device 121, the wireless device 121 does not need to wait and acquire the second system information for the frequency carrier. It also means that the first wireless device 121 may then continue with the initial access scan on another carrier frequency.

For example, the wireless device 121 may scan the next frequency band in its frequency capability list and repeat Actions 301-304 for the frequency carriers in that frequency band. Optionally, if the frequency carriers are ranked within a frequency band, the wireless device 121 may select the next carrier frequency and repeat Actions 301-304 for that frequency carrier. According to another option, the wireless device 121 may proceed to another frequency band or select another carrier frequency within the current frequency band based on the accumulated transmission history of the wireless device 121 and repeat Actions 301-304 for the next selected frequency carrier.

Hence, based on the determination in the Action 302, the first system information may be used by the wireless device 121 to speed up the initial access scan, i.e. PLMN/RAT/Frequency search, when attempting to access the wireless communications network 100. In some embodiments, when a SCP configuration is used for receiving the second system information in the wireless communications network 100, this may also be used to avoid problems with re-use of system signatures, SSI, or other synch signals between different network operators.

A further advantage is that the energy consumption in the wireless device 121 is reduced because the time required for scanning the capable carrier frequencies in the wireless communications network 100 by the wireless device 121 is reduced.

Action 305

In this optional action, in case the wireless device 121 receives the second system information comprising the one or more PLMNs supported on the frequency carrier by the network node 110 in Action 203, the wireless device 121 determines if the one or more PLMNs supported on the frequency carrier by the network node 110 comprised in the second system information match one of the PLMN(s) supported by the wireless device 121. Since the second system information comprises the full PLMN list for the frequency carrier, i.e. all supported PLMNs, the wireless device 121 may check whether or not one or more of the PLMNs supported by the network node 110 on the frequency carrier match any of the PLMN(s) supported by the wireless device 121.

Action 306

Optionally, when a match has been determined by the wireless device 121 in Action 305, the wireless device 121 accesses the wireless communication network 100 using the frequency carrier. This means that the wireless device 121 may use the information in the second system information, such as, e.g. RACH configurations, etc., to access the wireless communications network 100 on the frequency carrier.

In some embodiments, the wireless device 121 may select the first identified PLMN that matches one of the PLMN(s) supported by the wireless device 121 in Action 305. Alternatively, in some embodiments and before the wireless device 121 selects PLMN, carrier frequency and possibly also RAT, the wireless device 121 may proceed to scan some or all available carrier frequencies in some or all frequency bands, and possibly also some or all RATs, that the wireless device 121 is capable of transmitting on; hence, the wireless device 121 may identify all matching PLMNs by repeating the Actions 301-304 for each scanned frequency carrier before selecting PLMN, carrier frequency and possibly also RAT. The latter selection may be based on several criteria related to the PLMN(s), such as, e.g. according to rules for the PLMN(s) predetermined or configured in the wireless device 121 and/or USIM, the carrier properties, such as, e.g. the received power or Signal-to-Noise Ration, SINR, and possibly also RATs, such as, e.g. policies on RAT preferences that may be predetermined or configured in or downloaded to the wireless device 121.

Figure 6:
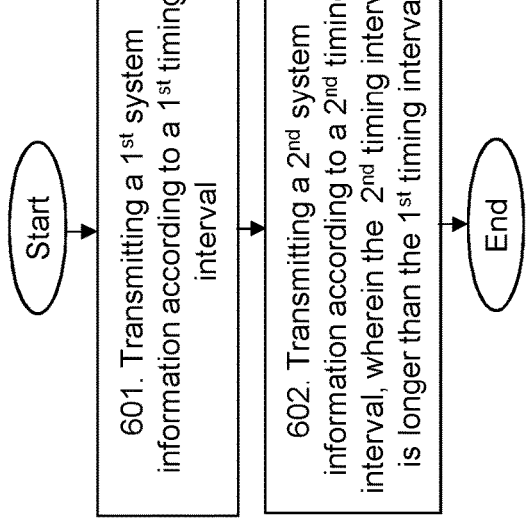
FIG. 6 is a flowchart depicting embodiments of a method in a network node.

Example of embodiments of a method performed by a network node 110 for transmitting system information to a wireless device 121 in a wireless communications network 100 will now be described with reference to the flowchart depicted in FIG. 6. FIG. 6 is an illustrated example of actions or operations which may be taken by a network node 110 in the wireless communication network 100. The method may comprise the following actions.

Action 601

In this action, the network node 110 transmits a first system information indicating one or more Public Land Mobile Networks, PLMNs, supported on a frequency carrier by the network node 110 according to a first timing interval.

This advantageously allows the network node 110 to enable the first system information to be used by the wireless device 121 to speed up its initial access scan when attempting to access the wireless communications network 100 on a given frequency carrier. In some embodiments, when a SCP configuration is used for transmitting the second system information in the wireless communications network 100, as described in Action 602, this may also be used to avoid problems with re-use of system signatures, SSIs, or other synchronization signals between different network operators.

According to some embodiments, the network node 110 may also collect events that identifies that which frequency carrier is frequently accessed by roaming wireless devices, such as, the wireless device 121. Based on the collected events, the network node 110 may broadcast the first signal information, i.e. the signal that encode the bits that enable the wireless device 121 to identify whether or not all of its allowed PLMNs are excluded from the PLMNs supported by the network node 110 on the frequency carrier, more often. This means that, based on the collected events, the network node 110 may modify the first timing interval, i.e. shorten or lengthen the first timing interval.

Action 602

Also, the network node 110 transmits a second system information comprising the one or more PLMNs supported on the frequency carrier by the network node (110) according to a second timing interval, wherein the second timing interval is longer than the first timing interval. This provides the advantage that power consumption in the network node 110 and the wireless communications network 100 is reduced, since most of the essential system information or the possible configurations, i.e. second system information, may be transmitted less often by the network node 110 in the wireless communications network 100. Advantageously, this is herein performed without penalizing the time for the wireless device 121 to access the wireless communications network 100.

Figure 7:
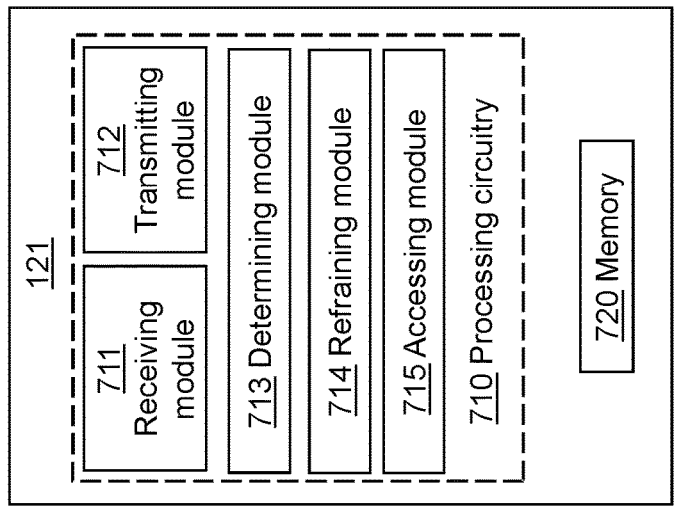
FIG. 7 is a block diagram depicting embodiments of a wireless device.

To perform the method actions in the terminal device 121 for receiving system information from a network node 110 in a wireless communications network 100 may comprise the following arrangement depicted in FIG. 7. FIG. 7 shows a schematic block diagram of embodiments of a wireless device 121. The embodiments of the wireless device 121 described herein may be considered as independent embodiments or may be considered in any combination with each other to describe non-limiting examples of the example embodiments described herein.

The wireless device 121 may comprise processing circuitry 710, a memory 720 and at least one antenna (not shown). The processing circuitry 710 may comprise a receiving module 711 and a transmitting module 712. The receiving module 711 and the transmitting module 712 may comprise RF circuitry and baseband processing circuitry. In particular embodiments, some or all of the functionality described above as being performed by the wireless device 121 may be provided by the processing circuitry 710 executing instructions stored on a computer-readable medium, such as the memory 720 shown in FIG. 7. Alternative embodiments of the wireless device 121 may comprise additional components, such as, the determining module 713, the refraining module 714, and the accessing module 715, responsible for providing functionality necessary to support the embodiments described herein.

The wireless device 121 or processing circuitry 710 is configured to, or may comprise the receiving module 711 configured to, receive a first system information indicating one or more Public Land Mobile Networks, PLMNs, supported on a frequency carrier by the network node 110. Also, the wireless device 121 or processing circuitry 710 is configured to, or may comprise the determining module 713 configured to, determine if the one or more PLMNs indicated in the first system information exclude all PLMN(s) supported by the wireless device 121. Furthermore, the wireless device 121 or processing circuitry 710 is configured to, or may comprise the receiving module 711 configured to, receive a second system information comprising the one or more PLMNs supported on the frequency carrier by the network node 110 when the one or more PLMNs indicated in the first system information does not exclude all PLMN(s) supported by the wireless device 121.

In some embodiments, the wireless device 121 or processing circuitry 710 may be configured to, or may comprise the refraining module 714 configured to, refrain from receiving the second system information when the one or more PLMNs indicated in the first system information exclude all PLMN(s) supported by the wireless device 121.

In some embodiments, the wireless device 121 or processing circuitry 710 may be configured to, or may comprise the determining module 713 configured to, determine if the one or more PLMNs supported on the frequency carrier by the network node 110 comprised in the second system information match one of the PLMN(s) supported by the wireless device 121. In this case, the wireless device 121 or processing circuitry 710 may be configured to, or may comprise the accessing module 715 configured to, access the wireless communication network 100 using the frequency carrier when a match has been determined.

In some embodiments, the wireless device 121 or processing circuitry 710 may be configured to store the at least one PLMN supported by the wireless device 121 in a UMTS Subscriber Identity Module, USIM, comprised in the wireless device 121. In some embodiments, the wireless device 121 or processing circuitry 710 may also be configured to store collected statistics or historical transmission data of the wireless device 121.

In some embodiments, the second system information comprise information which enables the wireless device 121 to access the wireless communications network 100 on the frequency carrier.

In some embodiments, the one or more PLMNs indicated in the first system information is indicated by fewer bits than the number of bits required to encode the one or more PLMNs comprised in the second system information. In some embodiments, the one or more PLMNs indicated in the first system information is indicated by one of: a checksum of the one or more PLMNs supported on the frequency carrier by the network node 110; an aggregated PLMN identifying two or more PLMNs of the one or more PLMNs supported on the frequency carrier by the network node 110; or a bloom filter generated using the one or more PLMNs supported on the frequency carrier by the network node 110.

In some embodiments, the wireless device 121 or processing circuitry 710 is configured to, or may comprise the receiving module 711 configured to, receive the first system information encoded and together with System Signatures, SSIs, when a System Control Plane, SCP, is used for receiving the second system information in the wireless communications network 100.

Furthermore, embodiments for receiving system information from a network node 110 in a wireless communications network 100 may be implemented through one or more processors, such as the processing circuitry 710 in the wireless device 121 depicted in FIG. 7, together with computer program code for performing the functions and actions of the embodiments herein. The program code mentioned above may also be provided as a computer program product, for instance in the form of a data carrier carrying computer program code or code means for performing the embodiments herein when being loaded into the processing circuitry 710 in the wireless device 121. The computer program code may e.g. be provided as pure program code in the wireless device 121 or on a server and downloaded to the wireless device 121.

Those skilled in the art will also appreciate that the processing circuitry 710 and the memory 720 described above may refer to a combination of analog and digital circuits, and/or one or more processors configured with software and/or firmware, e.g. stored in a memory, that when executed by the one or more processors such as the processing circuitry 720 perform as described above. One or more of these processors, as well as the other digital hardware, may be included in a single application-specific integrated circuit (ASIC), or several processors and various digital hardware may be distributed among several separate components, whether individually packaged or assembled into a system-on-a-chip (SoC).

Figure 8:
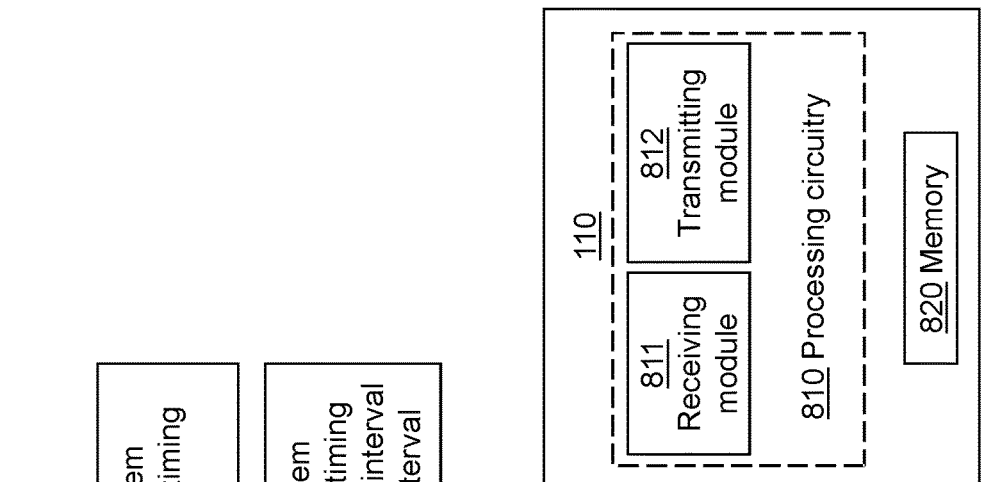
FIG. 8 is a block diagram depicting embodiments of a network node.

To perform the method actions in the network node 110 for transmitting system information to a wireless device 121 in a wireless communications network 100 may comprise the following arrangement depicted in FIG. 8. FIG. 8 shows a schematic block diagram of embodiments of a network node 110. The embodiments of the network node 110 described herein may be considered as independent embodiments or may be considered in any combination with each other to describe non-limiting examples of the example embodiments described herein.

The network node 110 may comprise a processing circuitry 810, a memory 820 and at least one antenna (not shown). The processing circuitry 810 may comprise a receiving module 811 and a transmitting module 812. The receiving module 811 and the transmitting module 812 may comprise RF circuitry and baseband processing circuitry. In particular embodiments, some or all of the functionality described above as being performed by the network node 110 may be provided by the processing circuitry 810 executing instructions stored on a computer-readable medium, such as the memory 820 shown in FIG. 8.

The network node 110 or processing circuitry 810 is configured to, or may comprise the transmitting module 812 configured to, transmit a first system information indicating one or more Public Land Mobile Networks, PLMNs, supported on a frequency carrier by the network node 110 according to a first timing interval. Also, the network node 110 or processing circuitry 810 is configured to, or may comprise the transmitting module 812 configured to, transmit a second system information comprising the one or more PLMNs supported on the frequency carrier by the network node 110 according to a second timing interval, wherein the second timing interval is longer than the first timing interval.

In some embodiments, network node 110 or processing circuitry 810 is configured to indicate the one or more PLMNs indicated in the first system information by fewer bits than the number of bits required to encode the one or more PLMNs comprised in the second system information. In some embodiments, network node 110 or processing circuitry 810 is configured to indicate the one or more PLMNs indicated in the first system information by one of: a checksum of the one or more PLMNs supported on the frequency carrier by the network node 110; an aggregated PLMN identifying two or more PLMNs of the one or more PLMNs supported on the frequency carrier by the network node 110; or a bloom filter generated using the one or more PLMNs supported on the frequency carrier by the network node 110.

Furthermore, embodiments for transmitting system information to a wireless device 121 in a wireless communications network 100 may be implemented through one or more processors, such as the processing circuitry 810 in the network node 110 depicted in FIG. 8, together with computer program code for performing the functions and actions of the embodiments herein. The program code mentioned above may also be provided as a computer program product, for instance in the form of a data carrier carrying computer program code or code means for performing the embodiments herein when being loaded into the processing circuitry 810 in the network node 110. The computer program code may e.g. be provided as pure program code in the wireless device 121 or on a server and downloaded to the network node 110.

Those skilled in the art will also appreciate that the processing circuitry 810 and the memory 820 described above may refer to a combination of analog and digital circuits, and/or one or more processors configured with software and/or firmware, e.g. stored in a memory, that when executed by the one or more processors such as the processing circuitry 820 perform as described above. One or more of these processors, as well as the other digital hardware, may be included in a single application-specific integrated circuit (ASIC), or several processors and various digital hardware may be distributed among several separate components, whether individually packaged or assembled into a system-on-a-chip (SoC).

The description of the example embodiments provided herein have been presented for purposes of illustration. The description is not intended to be exhaustive or to limit example embodiments to the precise form disclosed, and modifications and variations are possible in light of the above teachings or may be acquired from practice of various alternatives to the provided embodiments. The examples discussed herein were chosen and described in order to explain the principles and the nature of various example embodiments and its practical application to enable one skilled in the art to utilize the example embodiments in various manners and with various modifications as are suited to the particular use contemplated. The features of the embodiments described herein may be combined in all possible combinations of methods, apparatus, modules, systems, and computer program products. It should be appreciated that the example embodiments presented herein may be practiced in any combination with each other.

It should be noted that the word "comprising" does not necessarily exclude the presence of other elements or steps than those listed and the words "a" or "an" preceding an element do not exclude the presence of a plurality of such elements. It should further be noted that any reference signs do not limit the scope of the claims, that the example embodiments may be implemented at least in part by means of both hardware and software, and that several "means", "units" or "devices" may be represented by the same item of hardware.

It should also be noted that the various example embodiments described herein are described in the general context of method steps or processes, which may be implemented in one aspect by a computer program product, embodied in a computer-readable medium, including computer-executable instructions, such as program code, executed by computers in networked environments. A computer-readable medium may include removable and non-removable storage devices including, but not limited to, Read Only Memory (ROM), Random Access Memory (RAM), compact discs (CDs), digital versatile discs (DVD), etc. Generally, program modules may include routines, programs, objects, components, data structures, etc. that perform particular tasks or implement particular abstract data types. Computer-executable instructions, associated data structures, and program modules represent examples of program code for executing steps of the methods disclosed herein. The particular sequence of such executable instructions or associated data structures represents examples of corresponding acts for implementing the functions described in such steps or processes.

The embodiments herein are not limited to the above described preferred embodiments. Various alternatives, modifications and equivalents may be used. Therefore, the above embodiments should not be construed as limiting.

ABBREVIATIONS

PLMN Public Land Mobile Network
NAS Non-Access Stratum
AS Access Stratum
UE User Equipment
RAN Radio Access Network
CN Core Network
RBS Radio Base Station
UMTS Universal Mobile Telecommunications System
GSM Global System for Mobile Communications
UTRAN UMTS terrestrial RAN
WCDMA Wideband Code Division Multiple Access
HSPA High Speed Packet Access
RNC Radio Network Controller
BSC Base Station Controller
EPS Evolved Packet System
E-UTRAN Evolved Universal Terrestrial Radio Access Network
LTE Long Term Evolution
EPC Evolved Packet Core
SAE System Architecture Evolution
RAT Radio Access Technology
USIM UMTS Subscriber Identity Module
SCP System Control Plane
MIB Master Information Block
SIB System Information Block
SSI System Signature
AIT Access Information Table
PSS Primary Synchronization Signal
SSS Secondary Synchronization Signal

The invention claimed is:

1. A method performed by a wireless device configured for operation in a wireless communications network, the method comprising:
   evaluating an available carrier frequency, for use by the wireless device for accessing a network node in the wireless communications network, based on:
      acquiring first system information for the available carrier frequency, the first system information being transmitted on a first timing interval and non-uniquely identifying two or more Public Land Mobile Networks (PLMNs), at least one of which is supported by the network node for the available carrier frequency; and
      determining whether the wireless device supports at least one of the non-uniquely identified PLMNs; and
   responsive to determining that the wireless device supports at least one of the non-uniquely identified PLMNs:
      acquiring second system information for the available carrier frequency, the second system information being transmitted on a second timing interval longer than the first timing interval and uniquely identifying each PLMN supported by the network node for the available carrier frequency; and
      responsive to determining that the wireless device supports at least one of the uniquely identified PLMNs, accessing the network on the available carrier frequency using corresponding access information included in or indicated by the second system information.

2. The method of claim 1, further comprising, responsive to determining that the wireless device does not support any of the non-uniquely identified PLMNs, evaluating another available carrier frequency for use by the wireless device for accessing the network node.

3. The method of claim 1, further comprising, responsive to determining that the wireless device does not support any of the uniquely identified PLMNs, evaluating another available carrier frequency for use by the wireless device for accessing the network node.

4. The method of claim 1, wherein evaluating the available carrier frequency for use by the wireless device for accessing the network node comprises evaluating a currently selected one among two or more available carrier frequencies in a current iteration of an initial access scan procedure, and wherein initial access scan procedure includes the wireless device acquiring like first system information for individual ones of the two or more available carrier frequencies until finding an available carrier frequency on which the network node supports a PLMN that is also supported by the wireless device.

5. The method of claim 1, wherein the first system information comprises one or more aggregated PLMN identifiers, each aggregated PLMN identifier comprising a reduced-length value that maps to two or more full-length values that each uniquely identify a corresponding PLMN, and wherein the method includes determining which PLMNs are represented by each aggregated PLMN identifier.

6. The method of claim 1, wherein the first system information comprises a hash value or checksum representing a set of PLMNs, wherein at least one but not necessarily all of the PLMNs in the set of PLMNs are supported by the network node for the available carrier frequency, and wherein the method includes determining the set of PLMNs represented by the hash value or checksum.

7. The method of claim 6, wherein the first system information comprises a Bloom filter determined by hashing a set of PLMN identifiers, each PLMN identifier uniquely identifying one of the PLMNs in a set of PLMNs represented by the Bloom filter.

8. A wireless device configured for operation in a wireless communications network, the method comprising:
   communication circuitry configured for wirelessly communicating with the wireless communication network; and
   processing circuitry operatively associated with the communication circuitry and configured to:
      evaluate an available carrier frequency, for use by the wireless device for accessing a network node in the wireless communications network, based on being configured to:
         acquire first system information for the available carrier frequency, the first system information being transmitted on a first timing interval and non-uniquely identifying two or more Public Land Mobile Networks (PLMNs), at least one of which is supported by the network node for the available carrier frequency; and
         determine whether the wireless device supports at least one of the non-uniquely identified PLMNs; and
      responsive to determining that the wireless device supports at least one of the non-uniquely identified PLMNs:
         acquire second system information for the available carrier frequency, the second system information being transmitted on a second timing interval longer than the first timing interval and uniquely identifying each PLMN supported by the network node for the available carrier frequency; and
         responsive to determining that the wireless device supports at least one of the uniquely identified PLMNs, access the network on the available carrier frequency using corresponding access information included in or indicated by the second system information.

9. The wireless device of claim 8, wherein, responsive to determining that the wireless device does not support any of the non-uniquely identified PLMNs, the processing circuitry is configured to evaluate another available carrier frequency for use by the wireless device for accessing the network node.

10. The wireless device of claim 8, wherein, responsive to determining that the wireless device does not support any of the uniquely identified PLMNs, the processing circuitry is configured to evaluate another available carrier frequency for use by the wireless device for accessing the network node.

11. The wireless device of claim 8, wherein the processing circuitry is configured to evaluate the available carrier frequency for use by the wireless device for accessing the network node as a currently selected one among two or more available carrier frequencies, in a current iteration of an initial access scan procedure performed by the processing circuitry, and wherein initial access scan procedure includes the processing circuitry acquiring like first system information for individual ones of the two or more available carrier frequencies until finding an available carrier frequency on which the network node supports a PLMN that is also supported by the wireless device.

12. The wireless device of claim 8, wherein the first system information comprises one or more aggregated PLMN identifiers, each aggregated PLMN identifier comprising a reduced-length value that maps to two or more full-length values that each uniquely identify a corresponding PLMN, and wherein the processing circuitry is configured to determine which PLMNs are represented by each aggregated PLMN identifier.

13. The wireless device of claim 8, wherein the first system information comprises a hash value or checksum representing a set of PLMNs, wherein at least one but not necessarily all of the PLMNs in the set of PLMNs are supported by the network node for the available carrier frequency, and wherein the processing circuitry is configured to determine the set of PLMNs represented by the hash value or checksum.

14. The wireless device of claim 13, wherein the first system information comprises a Bloom filter determined by hashing a set of PLMN identifiers, each PLMN identifier uniquely identifying one of the PLMNs in the set of PLMNs represented by the Bloom filter.

15. A method performed by a network node configured for operation in a wireless communications network, the method comprising:
   transmitting first system information for an available carrier frequency, the first system information being transmitted on a first timing interval and non-uniquely identifying two or more Public Land Mobile Networks (PLMNs), at least one of which is supported by the network node for the available carrier frequency; and
   transmitting second system information for the available carrier frequency, the second system information being transmitted on a second timing interval longer than the first timing interval and uniquely identifying each PLMN supported by the network node for the available carrier frequency.

16. The method of claim 15, further comprising generating the first system information as one or more aggregated PLMN identifiers, each aggregated PLMN identifier comprising a reduced-length value that maps to two or more full-length values that each uniquely identify a corresponding PLMN, at least one of which is supported by the network node for the available carrier frequency.

17. The method of claim 15, further comprising generating the first system information as a hash value or checksum representing a set of PLMNs, wherein at least one but not necessarily all of the PLMNs in the set of PLMNs are supported by the network node for the available carrier frequency.

18. The method of claim 15, further comprising generating the first system information as a Bloom filter determined by hashing a set of PLMN identifiers, each PLMN identifier uniquely identifying one of the PLMNs in a set of PLMNs represented by the Bloom filter.

19. A network node configured for operation in a wireless communications network, the network node comprising:
   communication circuitry configured for wirelessly communicating with wireless devices operating in the wireless communications network; and processing circuitry operatively associated with the communication circuitry and configured to:
- transmit first system information for an available carrier frequency, the first system information being transmitted on a first timing interval and non-uniquely identifying two or more Public Land Mobile Networks (PLMNs), at least one of which is supported by the network node for the available carrier frequency; and
- transmit second system information for the available carrier frequency, the second system information being transmitted on a second timing interval longer than the first timing interval and uniquely identifying each PLMN supported by the network node for the available carrier frequency.

20. The network node of claim 19, wherein the processing circuitry is configured to generate the first system information as one or more aggregated PLMN identifiers, each aggregated PLMN identifier comprising a reduced-length value that maps to two or more full-length values that each uniquely identify a corresponding PLMN, at least one of which is supported by the network node for the available carrier frequency.

21. The network node of claim 19, wherein the processing circuitry is configured to generate the first system information as a hash value or checksum representing a set of PLMNs, wherein at least one but not necessarily all of the PLMNs in the set of PLMNs are supported by the network node for the available carrier frequency.

22. The network node of claim 19, wherein the processing circuitry is configured to generate the first system information as a Bloom filter determined by hashing a set of PLMN identifiers, each PLMN identifier uniquely identifying one of the PLMNs in a set of PLMNs represented by the Bloom filter.

* * * * *